Dec. 27, 1955  F. W. PITTINGER  2,728,270
DUPLICATING MACHINES
Filed May 4, 1953  4 Sheets-Sheet 4
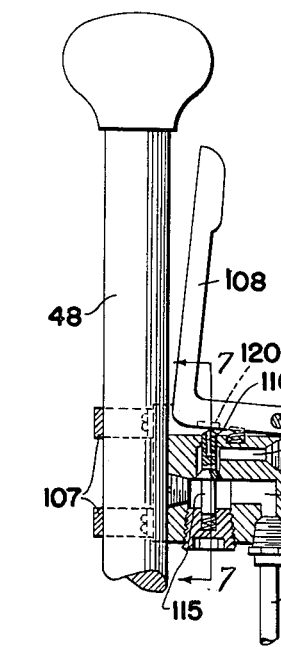
FIG. 6
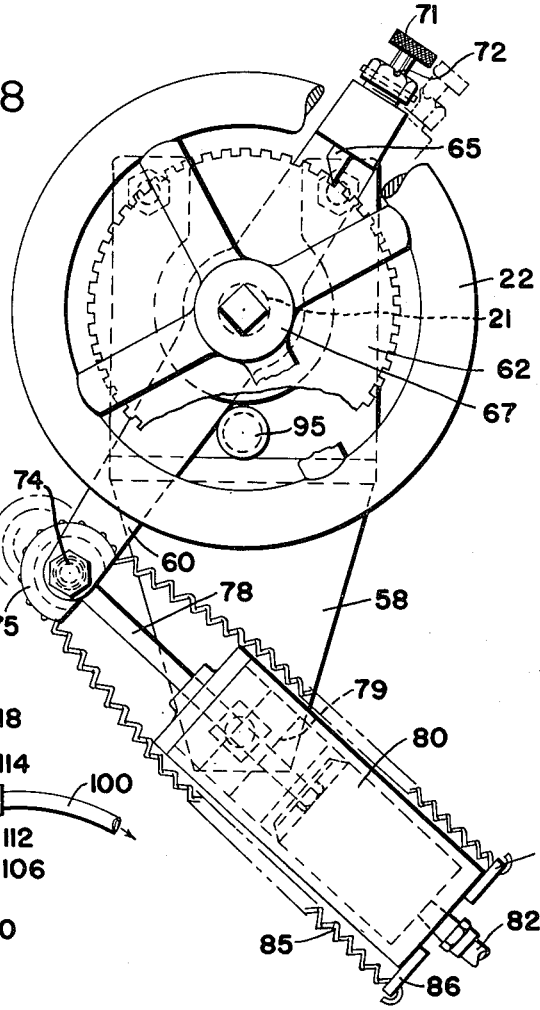
FIG. 8
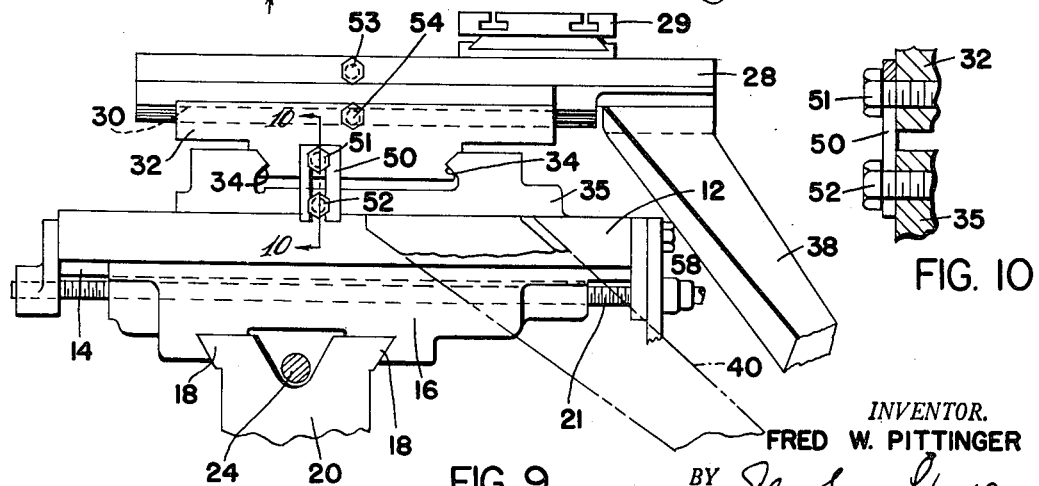
FIG. 9
FIG. 10
INVENTOR.
FRED W. PITTINGER
BY Ely, Frye & Hamilton
ATTYS.

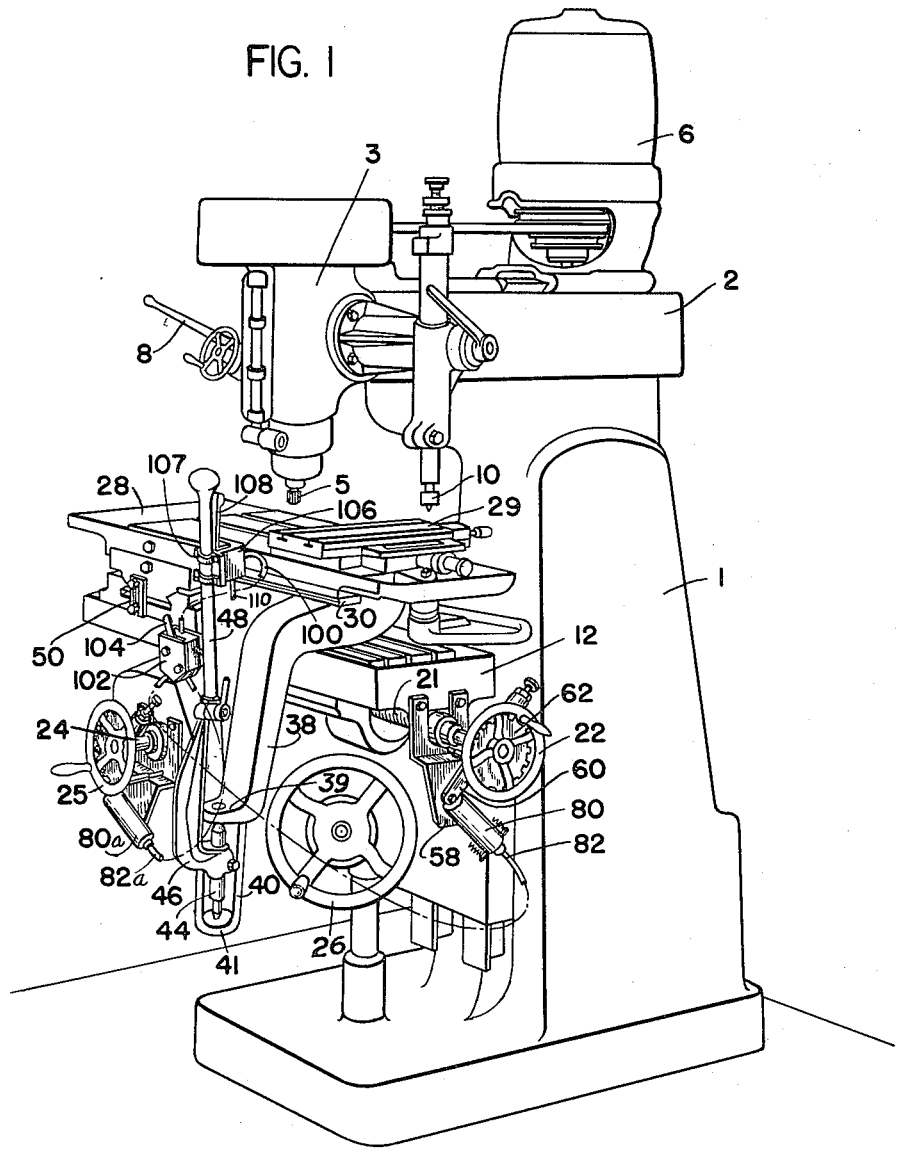

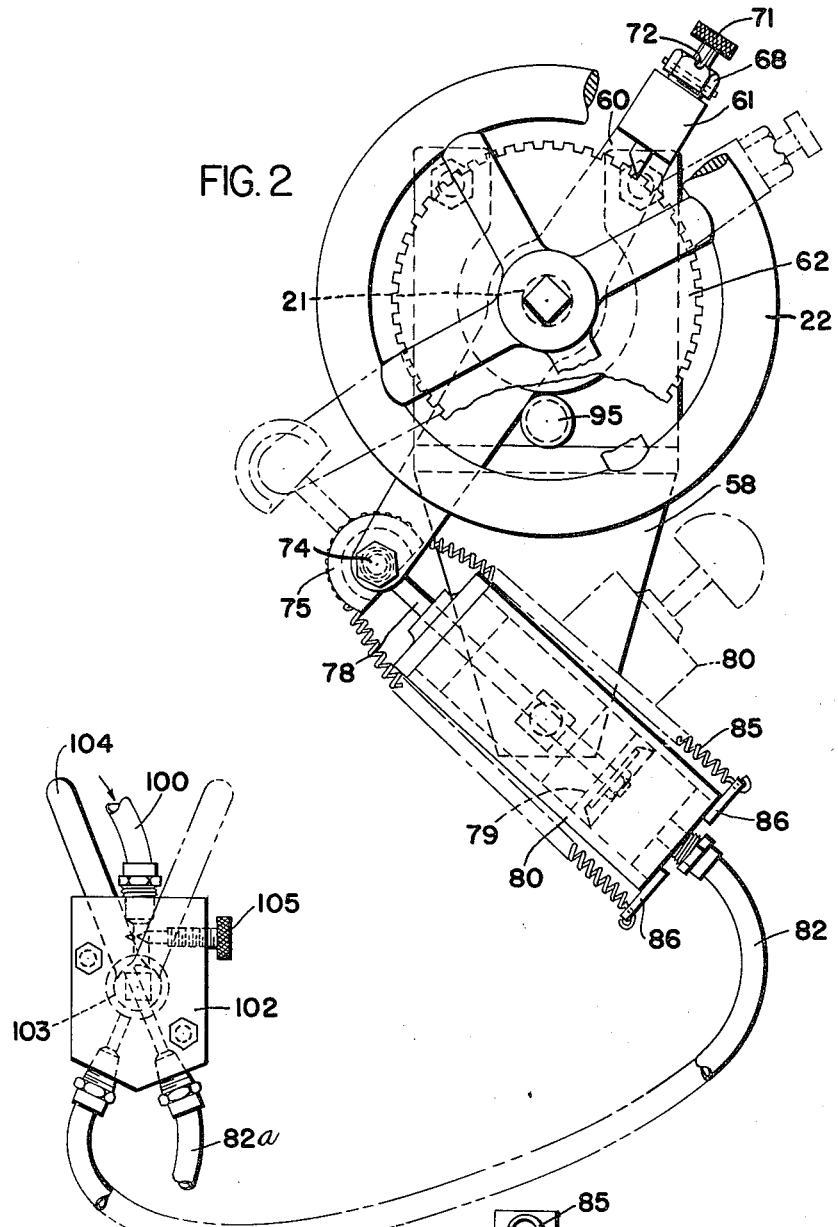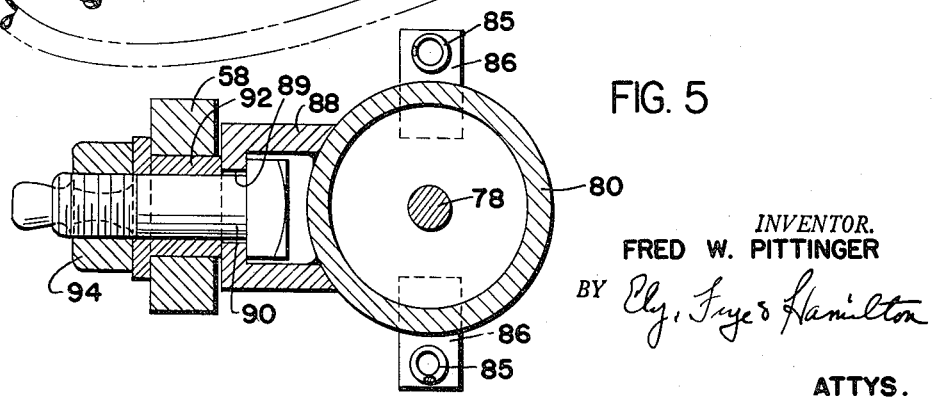

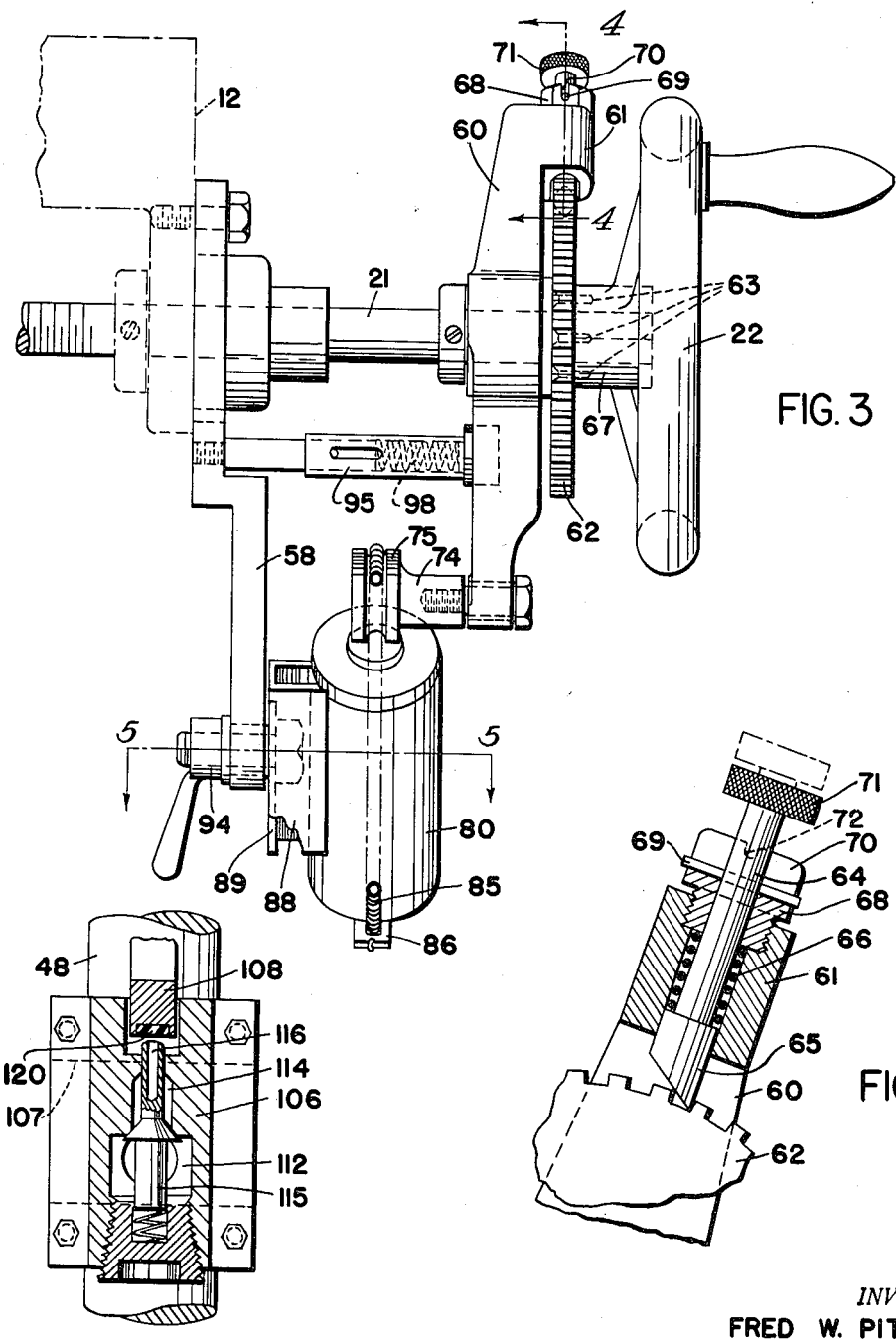

United States Patent Office 2,728,270
Patented Dec. 27, 1955

2,728,270

DUPLICATING MACHINES

Fred W. Pittinger, Akron, Ohio, assignor to The Mechanical Mold & Machine Co., Akron, Ohio, a corporation of Ohio Application May 4, 1953, Serial No. 352,744

6 Claims. (Cl. 90—21)

The present invention relates to improvements in machine tools known as duplicators in which a cutting tool is arranged to be controlled by a tracer or stylus which engages a pattern or machine die, the work being moved to and fro during the cutting operation by the movement of the table to which it is secured. The cutting tool does not move transversely but is raised and lowered by the operator in case the depth of the tool is to be changed during cutting. All of the movements are governed by the movement of the tracer or stylus over the pattern which is a replica of a unit of the finished work.

The invention is particularly designed for use in conjunction with duplicating machines of the type shown in United States Patent No. 2,005,696 issued June 18, 1935. The machines are well known and widely distributed, and as the invention has to do with an improvement therein it is not necessary to give more than sufficient information to enable one familiar with these machines to know and understand the advancement and improvement upon the prior machine. Reference to the above patent will be helpful in understanding the invention.

The improvement which is described and shown herein relates to mechanisms for feeding the work to the cutting tool fastener and more economically than with the machines as formerly made and used. The incorporation of these improvements in a machine of the type set forth will make the labor connected with any given job much lighter and easier than with the former machines. The work may thus be done more quickly and at less cost without in any way impairing the quality of the work.

It will be understood and appreciated that in describing the invention a standard machine of the type set forth has been selected but the invention may be applied to other machines for a similar purpose. It will also be appreciated that exact conformity to the details of the invention as set forth is not essential to a realization of the invention or to embodiments thereof within the scope of the appended claims.

In the drawings, in which the best known and preferred form of the invention is shown as it has been put into actual productive use:

Fig. 1 is a view in perspective of a typical duplicating machine of the type to which this invention is applicable. In this view the improvements are illustrated as applied to the machine and those parts of the standard machine with which the improvements cooperate have been illustrated, other parts which do not directly enter into the new combination being omitted.

Fig. 2 is a view of one of the elements by which the main table or carriage of the machine is moved in its guideways. This may be either the means for moving the carriage from side to side or from front to rear, as both mechanisms are the same.

Fig. 3 is a side elevation of the parts shown in Fig. 2.

Fig. 4 is a section on the line 4—4 of Fig. 3.

Fig. 5 is a section on the line 5—5 of Fig. 3.

Fig. 6 is a view, partly in section, showing the hand operated mechanism by which the movement of the carriage is controlled.

Fig. 7 is a section on the line 7—7 of Fig. 6.

Fig. 8 is a view similar to Fig. 2 but showing the parts adjusted for a different stroke.

Fig. 9 is a front elevation of the work support.

Fig. 10 is a section on the line 10—10 of Fig. 9.

In order to make more concise the description and understanding of the present invention, those parts of the existing machine which enter into the new combination will first be described.

1 is the vertical upright or standard on the upper end of which is the horizontal arm 2, the outer end of which carries the housing 3 in which the cutting tool 5 is mounted for rotary and vertical movement; 6 is the motor by which the cutter is driven and 8 is the hand lever by which it is raised or lowered for variations in the depth of the cut. On the side of the housing is the tracer or stylus 10 which is coordinated with the tool so that the two rise and fall in unison.

The work supporting carriage is indicated at 12 and is mounted for horizontal movement from side to side through ways 14 on an undercarriage 16. The undercarriage 16 is supported for horizontal movement fore and aft upon ways 18 on a bed plate 20. The side-to-side or to and fro movement of the carriage 12 is accomplished through a screw-threaded feed shaft 21 rotated by a hand wheel 22. The fore and aft movement of the carriage 12 is accomplished through a screw-threaded feed shaft 24 at right angles to the shaft 21 and rotated by a hand wheel 25. The bed plate 20 is raised and lowered through the hand wheel 26.

It will be seen that the carriage 12 is capable of movement in a horizontal plane in two directions and that either the feed shaft 21 or the feed shaft 25 may be used to vary the position of the work with respect to the cutting tool.

The work is clamped to a table 28 below the cutting tool and to the top of this table is attached a pattern supporting platform 29 beneath the tracer or stylus 10, so that the work and the pattern move together. The table 28 is moved to and fro over horizontal guideways 30 formed in an under-table 32, the latter being mounted for fore and aft movement over guideways 34 in the top of a pedestal 35 clamped to the carriage 12. It will be seen that in addition to the facilities for horizontal movement provided by the carriage 12, the work is capable of horizontal movement in two directions at right angles to each other by reason of the mounting of the table 28.

To the underside of the work table 28 is attached an arm 38 which extends forwardly over the carriage 12 and then downwardly at the front of the machine where it terminates in a horizontal ledge 39. Attached to the pedestal 35 is a bracket 40 which terminates in a ledge 41 located below but spaced from the ledge 38.

In the opposed ledges 39 and 41 are bearings in which are engaged the pointed ends of an expansible pin 44 by which the point represented by the bearing in the ledge 39 may be shifted with respect to the point represented by the bearing in the ledge 41, and thus the table 28 may be moved in a horizontal plane in either direction with respect to the carriage 12 on the ways 30 or 34. The ways 30 and 34 are ball bearing ways so that the table moves very freely. To a midway point on the pin 44 is attached one end of a C-shaped bracket 46, in the other end of which is adjustably mounted an operating stick or hand lever 48.

The mechanism, as described so far, is standard for the type of duplicating machine to which the invention is especially, but not exclusively, adaptable. It will be seen that if the operator is cutting a pattern which has depth, with his left hand he will move the cutter and the stylus in a vertical direction by manipulating the hand lever 8 while he manipulates the work to shift it horizontally by movement of the table 28 through manipulation of the stick 48. This will be satisfactory for one cutting operation but when the work is to be advanced for a new cutting operation the operator must shift the carriage 12 through either the hand wheel 22 or 25. This delays the operation of the machine and as the carriage 12 must be shifted after each cutting stroke is completed, it is a laborious operation and time consuming operation.

The purpose of the present invention is to provide means directly under the control of the operator by which, without taking a hand off either lever 8 or 48, the work may be advanced to a new cutting point. This may be done at any time and at any point in the movement of the table 28. Briefly stated, this is done by the provision of an additional control mechanism by which the operator, without taking his hands from the lever 8 or 48, may shift the carriage 12 either to and fro or fore and aft. The specific location of the additional control device which has been chosen is on the lever or stick 48 where with the pressure of the little finger the carriage 12 will be shifted at any point in its stroke in the desired direction and to an extent which will have been predetermined. It will be understood, however, that the location of additional control device is not important except as a matter of convenience and that other locations may be provided, such for example as at the base of the machine where it would be actuated by the operator's foot.

It should be noted that, in order to render the mechanism effective, the table 28 should be locked or prevented from movement by the lever 48 in the direction in which the auxiliary or additional control mechanism will move the table. Thus, if the table is to be advanced by the auxiliary control fore and aft it should be locked so that the lever 48 can move the table only in the to and fro direction. Or, if the table is to be moved to and fro by the auxiliary mechanism, it should be locked against to and fro movement by the lever 48.

In the set-up shown in Fig. 1, the table is being moved fore and aft by the auxiliary mechanism and moved to and fro by the lever 48. In other words, the hand wheel 25 and shaft 24 are operating while the hand wheel 22 and shaft 21 are inactive. The lever 48 is movable in a plane parallel to the front of the machine, but is immovable in the plane at right angles to the front of the machine.

To lock the table 28 against fore and aft movement by the lever 48, a U-shaped clamping plate 50 is used to hold the under-table 32 with respect to the pedestal 35 by clamping it through bolts 51 and 52 set in the parts 32 and 35. If the lever 48 is to move the work table fore and aft and the auxiliary control device to move it to and fro, the clamping plate will be shifted to the two bolts 53 and 54 on the table 28 and under-table 32, respectively.

Attempts have been made heretofore to provide this type of machine with mechanism for shifting the work to a new cutting position supplementing the functions of the hand lever 48, but they have not been successful because they have been impractical and inconvenient. One of the objections to former mechanisms which have been added to these duplicators is that the table was movable by the mechanism only at the ends of a full stroke of the table 28 by the lever 48, whereas in the machine of this invention the table may be shifted at any time during the cutting stroke. Hence, the table may be shifted at the end of a short stroke or even without having moved the table at all by the lever 48.

The mechanisms for rotating either the shaft 21 or the shaft 24 are identical and hence only one will be described, the shaft 21 having been selected.

To the right hand end of the table 12, at the point where the shaft 21 is located, is attached a depending bracket 58 and rotatably mounted on the outer end of the shaft 21 is a swinging arm 60 having an extension 61 which overhangs a toothed wheel 62 fastened by bolts 63 to the hub 67 of the hand wheel 22. Located in the extension 61 is a sliding pin 64, the inner end of which is provided with a beveled pawl or tooth 65 to engage the teeth of the wheel 62 and advance it in either direction depending upon the setting of the pin. The extension 61 is hollowed out to receive a spring 66 which presses the tooth 65 toward the wheel, the spring being confined by a cap screw 68 threaded into the end of the lever 60. The pin 64 is guided by a pin 69 movable in a transverse slot 70 cut across the top of the cap screw. The upper end of pin 64 is provided with a knob 71 by which it may be raised to free the pawl from the wheel 62 so that the shaft 21 may be turned by hand, or so as to reverse the direction of the pawl for operation of the shaft 21 in the opposite direction. A detent 72 on the cap screw 68 at right angles to slot 70 engages pin 69 to hold pawl 65 out of engagement with toothed wheel 62. This is done while making adjustments on piston stroke.

To the other end of the arm 60 is pivoted a transverse pin 74 which extends toward the machine, its inner end being formed as a curved, grooved saddle 75. The saddle 75 is attached to the outer end of a piston rod 78, the piston 79 of which is reciprocable in a cylinder 80 to which compressed air is admitted through the conduit 82 as will be described. The air under pressure moves the piston outwardly until it strikes the top of the cylinder. A coil spring 85 anchored at its ends to plates 86 on the cylinder and with its central portion lying in the groove in the saddle 75 retracts the piston when the air pressure is released.

Cylinder 80 is welded to a channel block 88, the flat side of which is provided with a long slot 89. A bolt 90, the head of which is received in the channel and the stem of which passes through a bearing sleeve 92, holds the cylinder in position on the lower end of the bracket 58 through the clamping nut 94.

When it is desired to regulate the stroke of the piston 79 and thus the extent of feed imparted to the shaft 21 on a single stroke thereof, the bolt 90 is shifted in the slot 89 so as to bring the upper end of the cylinder closer to or farther from the piston in its idle position. In Fig. 2 the piston is adjusted for a long stroke and in Fig. 8 for a short stroke. The extent to which the arm 60 will move on the return stroke of the piston is governed by the pin 95 which is mounted on the bracket 58 in the path of the arm 60.

As shown in full lines in Fig. 2, the movement of the piston will rotate the wheel 62 and the shaft 21 in the clockwise direction. To reverse the direction and rotate the shaft in anti-clockwise direction, the nut 94 is loosened and the cylinder swung about to the position shown in dotted lines in Fig. 2. This will necessitate the reversal of the pawl 65. In order to do this it is necessary to depress the pin 95 so that the arm 60 may pass, and for this purpose the pin 95 is made in two telescoping parts as shown in Fig. 3 with an interior spring 98 to maintain the pin in its expanded condition.

The corresponding cylinder for the hand wheel 25 and its shaft 24 is indicated at 80a and the conduit to this cylinder at 82a.

Compressed air to operate either cylinder 80 or 80a is admitted through the supply conduit 100, the discharge end of which is tapped into a distributor block 102. A rotatable valve 103 shifted by a lever 104 determines whether the compressed air will be admitted to cylinder 80 or 80a. As shown in Fig. 2, the air will be admitted to cylinder 80a through the conduit 82a. The distributor block is shown as mounted on the carriage 12 but any suitable location may be selected. An adjustable pin 105 controls the amount of air admitted to either cylinder.

At the other end the conduit 100 is set in a valve block 106 which, in the form of the invention shown herein, is clamped by straps 107 to the control stick 48 near the top thereof so that the operator may with the little finger of the hand which controls the lever actuate the trigger lever 108 by which air is admitted to the cylinder 80 or 80a, depending upon the position of the lever 104.

The air is supplied to the machine through a conduit 110 which is set in the valve block 106 as shown in Fig. 6, and leads to a transverse passage 12 which is in controlled communication through a second passage 14 with the conduit 100. A spring pressed valve 115 is located between the passages 112 and 114, and when seated as shown in Figs. 6 and 7 will prevent the passage of air to conduit 100. In this position an exhaust passage 116 in the valve is in communication with the passage 114 so that air will be released from the cylinder 80 or 80a as the case may be. The lever 108 is pivoted at 118 on the valve block and where it will contact the end of the valve to depress it and admit air to either cylinder. A pad 120 is located in the lever so as to seal the exhaust passage 116 when the valve 115 is opened.

*Operation*

The operator having mounted the pattern and the work on the table 106 and seen that the parts are in their proper positions now clamps the table so that it cannot be moved by the lever 48 in the direction in which it will be moved by the cylinder 80 or 80a. As stated, the clamping plate 50 is shown in the position to prevent any fore and aft movement of the table by the lever 48, and the lever 104 is in position so that the air pressure will be admitted to the cylinder 80a. He now starts the cutter in rotation and with his left hand he moves the cutting tool up and down following the pattern through the stylus. During this operation he moves the hand lever 48 from left to right, which causes the work to move to and fro across the tool. As each cut is finished, with his little finger the operator moves the trigger lever 108 and the piston in the cylinder 80a rocks the arm 60 to the extent determined by the setting of the cylinder feeding the work across the tool to a new cutting point. This will continue as long as the pattern will accommodate the stylus when the work on the table will be shifted to a new cutting area.

To cause the cylinder 80 to act, all that is required is to shift the clamping plate 50 to the bolts 53 and 54 and to shift the lever 104 so the air will be directed to the cylinder 80.

What is claimed is:

1. In a duplicating machine having a carriage movable in two angularly opposed directions, a work table on the carriage and movable thereon in two angularly disposed directions, a hand lever connected to the table and operable to move the table in either direction on the carriage, feed mechanisms to move the carriage in either direction, a clamp to hold the table from movement on the carriage in one direction only by the lever, separate fluid pressure means to actuate each said feed mechanism, and an operator-actuated control to actuate either of said fluid pressure means selectively to move the table in the direction transverse to that in which it is movable by the hand lever.

2. In a duplicating machine having a carriage, a fluid pressure device to move the carriage in one direction, a separate fluid pressure device to move the carriage at right angles thereto, a work table on the carriage, a lever connected to the work table and operable to move the table on the carriage to and fro and fore and aft, a clamp to hold the table from movement by the lever in one direction only, and an operator-actuated control to actuate either pressure device selectively to move the table in the direction transverse to that in which it is movable by the lever.

3. In a duplicating machine having a carriage, a threaded shaft to move the carriage in one direction, a second threaded shaft to move the carriage at right angles thereto, a work table mounted on the carriage and movable thereon to and fro or fore and aft, means to so move said work table, a clamp to hold the work table from movement on the carriage in one direction only, separate fluid pressure means to rotate each threaded shaft, and an operator-actuated control to admit fluid pressure to either said fluid pressure means selectively to move the table in the direction in which it is restrained from movement by the clamp.

4. In a duplicating machine having a carriage, a threaded shaft to move the carriage in one direction, a second threaded shaft to move the carriage at right angles thereto, a work table mounted on the carriage and movable thereon to and fro or fore and aft, means to so move said work table, a clamp to hold the work table from movement on the carriage in one direction only, a separate fluid pressure cylinder and piston to rotate each threaded shaft, an operator-actuated control to admit fluid pressure to either said fluid pressure means selectively to move the table in the direction in which it is restrained from movement by the clamp, and means to vary the direction and also the length of stroke of each piston.

5. In a duplicating machine having a carriage, a threaded shaft to move the carriage in one direction, a second threaded shaft to move the carriage at right angles thereto, a work table mounted on the carriage and movable thereon to and fro or fore and aft, a hand lever to so move said work table, a clamp to hold the work table from movement on the carriage in one direction only, separate fluid pressure means to rotate each threaded shaft, and an operator-actuated control to admit fluid pressure to either said fluid pressure means selectively to move the table in the direction in which it is restrained from movement by the clamp.

6. A duplicating machine having a carriage, a threaded shaft to move the carriage in one direction, a second threaded shaft to move the carriage in a direction at right angles thereto, a piston and cylinder at each shaft and adapted to rotate the shaft to a predetermined extent on one stroke thereof, a work table movable to and fro or fore and aft on the carriage, a lever to move the work table over the carriage, means to lock the carriage from movement in one direction only, a valve to admit air to either of said cylinders and a second valve to direct the air to either cylinder selectively.

References Cited in the file of this patent

UNITED STATES PATENTS

| | | |
|---|---|---|
| 1,944,455 | Parsons | Jan. 23, 1934 |
| 2,005,696 | Gorton, 3d et al. | June 18, 1935 |
| 2,078,871 | Panzner | Apr. 27, 1937 |
| 2,466,198 | Berthiez | Apr. 5, 1949 |

FOREIGN PATENTS

| | | |
|---|---|---|
| 986,951 | France | Apr. 7, 1951 |